United States Patent Office 2,789,697
Patented Apr. 23, 1957

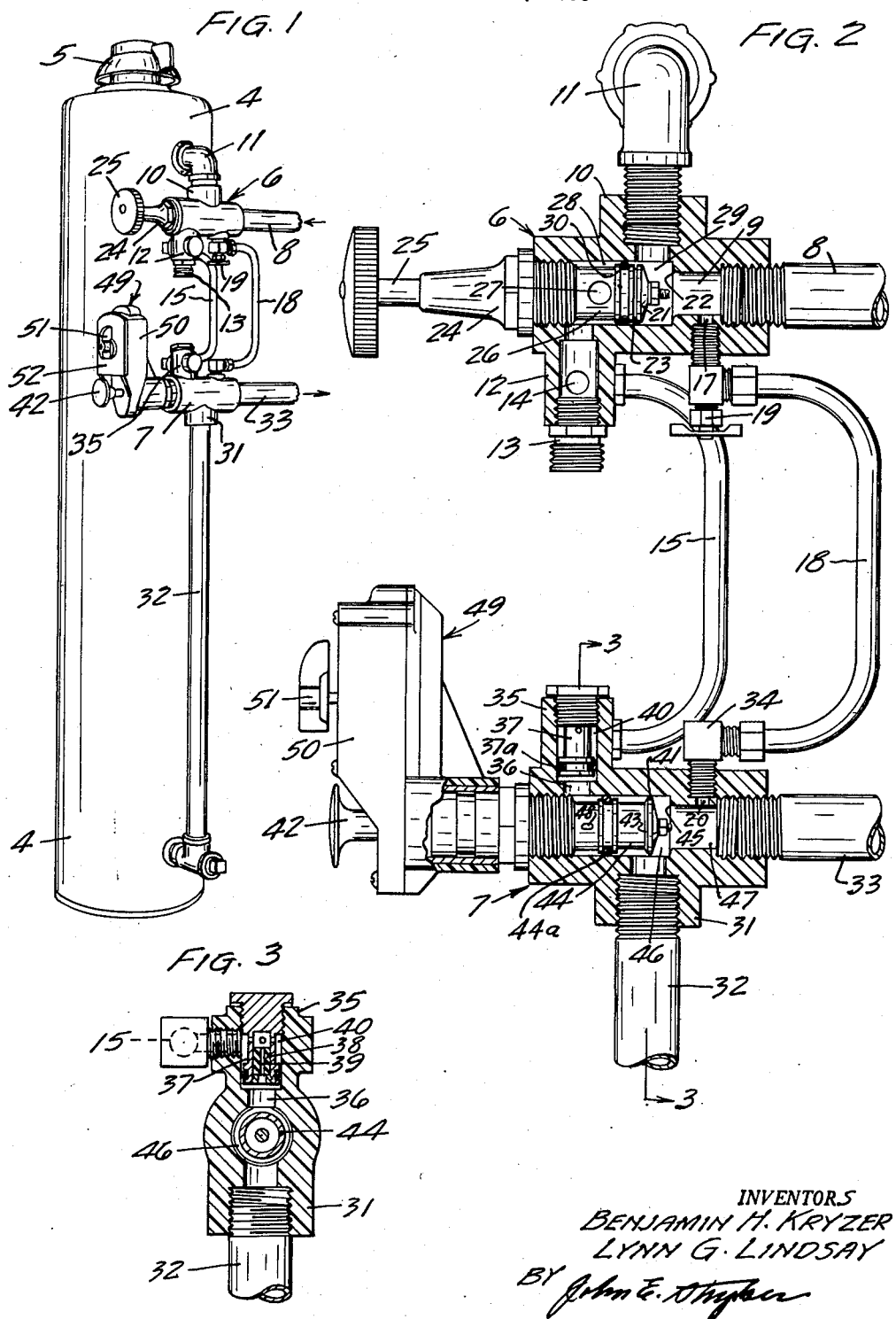

2,789,697
CONTROL FOR WATER SOFTENERS

Benjamin H. Kryzer and Lynn G. Lindsay, St. Paul, Minn., assignors to The Lindsay Company, St. Paul, Minn., a corporation of Minnesota Application February 2, 1953, Serial No. 334,668

2 Claims. (Cl. 210—140)

This invention relates to controls for water softeners of the type having a tank containing a body of zeolites requiring periodic regeneration and has for its principal objects to provide an improved valve nest whereby the cost of the control is reduced and its maintenance, assembly and operation is facilitated.

A further and particular object is to provide a control of the class described comprising a pair of similar valve casings which are spaced apart and connected together by detachable tubular members, each of said casings being provided with improved valves and flow controls whereby efficient softening of the water and regeneration of the zeolites under various local conditions of water pressures and hardness is promoted.

Our invention also includes certain other novel features of construction which will be more fully pointed out in the following specification and claims.

Referring to the accompanying drawing which illustrates, by way of example and not for the purpose of limitation, a preferred form of our invention:

Figure 1 is a perspective view showing our improved control mounted on a water softener of common type;

Fig. 2 is a part side elevational and part vertical sectional view showing our improved valve nest and connections therefor, and Fig. 3 is a fragmentary sectional view taken approximately on the line 3—3 of Fig. 2.

In the drawing the numeral 4 indicates a water softener tank containing zeolites and the numeral 5 a top closure member which is readily removable from the tank to permit charges of salt for regenerating the zeolites to be fed into the tank. Our improved control comprises a pair of valve units having similar and separate valve casings indicated generally by the numerals 6 and 7 respectively. Each of these casings is formed with threaded terminals forming ports and passages for the liquid. The casing 6 may be supplied with hard water from a pipe 8 which communicates with the inlet port and an internal chamber 9. An upwardly opening branch 10 of the casing 6 is connected by suitable fittings including an elbow 11 with the upper portion of the tank 4. A second branch 12 of the casing 6 forms a port having a threaded connection with a waste fitting 13 and another port 14 opens into a tube 15 extending to the casing 7. Another port 17 is formed in the casing 6 to supply water to a backwash tube 18 under control of a backwash valve 19. From the lower end of the tube 18 water enters a port 20 formed in the casing 7.

Within the main cylindrical chamber of the casing 6 a manually operable valve head 21 is operative to close either at an annular seat 22 or at a similar and oppositely disposed seat 23. This valve unit has a bonnet 24 in which a stem 25 is threaded and the bonnet has a threaded connection with the casing 6 and an integral cylindrical extension 26 formed with the seat 23 at its inner extremity. The extension 26 forms a passage having an opening 27 in communication with an annular chamber 28 and the latter is separated from a valve chamber 29 by an annular sealing ring 30.

When the valve head 21 is in the position shown in Fig. 2, hard water from the pipe 8 may flow to the upper portion of the tank through the chambers 9 and 29, the casing branch 10 and elbow 11. By turning the stem 25, the head 21 may be closed against its seat 22 thereby cutting off the direct supply of hard water to the chamber 29 and opening communication between the upper portion of the tank and the waste fitting 13 through the chamber 29, extension 26, opening 27, chamber 28 and branch 12.

Valve casing 7 has a threaded branch 31 forming a port in communication with a pipe 32 which extends to and communicates with the lower portion of the tank 4. Additional ports are formed in the casing 7 to communicate respectively with a soft water service pipe 33 and with a fitting 34 connected to the tube 18. Another cylindrical branch 35 of the casing 7 is formed with a port communicating with the tube 15 and contains an automatic flow regulating device whereby a substantially uniform rate of flow to waste is maintained irrespective of the pressure of the water in a passage 36 formed in the casing 7. As best shown in Fig. 3, the flow regulating device comprises a rigid cylindrical member 37 containing a rubber core 38 having an axial passage 39 for liquid which communicates at one end with the passage 36. Increases in pressure cause approximately proportional compression of the rubber core 38 and corresponding restriction of the axial passage 39. The latter communicates at its upper end with an annular chamber 40 which is separated from the chamber 36 by a suitable sealing ring 37a. The chamber 40 is in communication with the tube 14 so that fluid may pass at the controlled rate through the tube 15 and port 14 to the waste fitting 13 during regeneration and flushing of the softener. The waste outlet fitting 13 is adapted to be connected to a hose for discharging the waste liquid in a laundry tub, sump or other available waste disposal conduit.

Within the casing 7 a two-way valve head 41 is operatively connected to a plunger handle 42 and arranged to close either at a seat 43 formed on an end of a cylindrical member 44 or at an opposite disposed annular seat 45. When the head 41 is closed against its seat 43, as shown in Fig. 2, the bottom of the tank 4 is in communication with the service pipe 33 through the pipe 32, a chamber 46 and a port 47. By actuating the plunger handle 42 the head 41 may be closed at its seat 45 thereby cutting off communication between the bottom of the softener tank and the service pipe and opening communication between the bottom of the tank and waste outlet through the pipe 32, chamber 46, cylindrical member 44, passages 48 and 36 and hence through the automatic flow regulating device to the tube 15, port 14 and fitting 13. Passage 36 is separated from chamber 46 by a sealing ring 44a which embraces the exterior of the cylindrical member 44.

A semi-automatic time control is provided for the regenerating and flushing period. A timer suitable for this purpose is described in U. S. Patent No. 2,610,147, granted September 9, 1952, to L. G. Lindsay. As best shown in Fig. 2, the time control mechanism, indicated generally by the numeral 49, is mounted on the valve casing 7 and includes latch mechanism operatively connected to the plunger 42 for retaining the head 41 in closed relation to its seat 45 during the regenerating and flushing period. Spring means within the tubular member 44 are arranged to bias the head 41 toward closed position relative to the seat 43. Clock mechanism contained in a housing 50 is operative to cause the head 41 to move to its closed position in relation to the seat 43 at the end of a predetermined regeneration and flushing period. This timing mechanism is under control of a manually operable hand 51 adapted to be set by reference to a dial 52 to determine the duration of the selected period.

During the water softening operation the head 21 is closed at its seat 23 and the head 41 at its seat 43 and the backwash valve 19 is closed. Hard water under pressure from the pipe 8 is thus caused to flow from chamber 9 through chamber 29, casing branch 10 and fittings including elbow 11 into the upper portion of the tank 4, then downward through the zeolite bed. Softened water is conducted up through the pipe 32 to the valve casing 7 and flows therein to the service pipe 33 through chamber 46 and port 47.

To backwash the zeolite bed, the head 21 is closed at its seat 22 and the valve 19 is opened causing water to flow from the pipe 8 through port 17, valve 19, tube 18, fitting 34, port 20 and chamber 46, thence through pipe 32 to the lower portion of the tank 4, up through the zeolite bed and out from the upper surface of the bed through the elbow 11, valve casing 6, past valve seat 23, through extension 26, passage 27, chamber 28 and fitting 13 to waste.

Preparatory to regenerating the softener, valve head 21 is closed at its seat 22, backwash valve head 19 is closed and valve 41 is retained in closed relation to its seat 43. This shuts off the supply of water and permits the level of water in the tank 4 to be lowered sufficiently to admit the charge of salt. The top closure 5 is then removed, the required amount of salt is fed into the tank and the closure 5 is replaced. The displaced water drains off through the elbow 11, past valve seat 23 and through the connecting passages and ports and fitting 13 to waste. After the required charge of salt has been placed in the tank, as described, regeneration may be initiated by merely actuating the head 21 to open position relative to seat 22 and closed position at its seat 23, setting the clock hand 51 in a suitable position in relation to the dial 52 and thereupon actuating the plunger handle 42 to close and latch the valve head 41 in relation to its seat 45. Water is thereby caused to flow from the pipe 8 through the passages and ports in the casing 6 and elbow 11 to the upper portion of the tank where the salt is dissolved and then carried downward as brine through the zeolites where the base exchange reaction takes place. The spent brine passes up through the pipe 32 and ports and open passages in the casing 7, through the flow regulator device 37, tube 15 and port 14 to the waste outlet fitting 13. As hereinbefore indicated, the rate of flow is regulated by the device 37 to insure the gradual flow required for complete regeneration of the zeolites and subsequent flushing out of the brine. Thereupon, the time control device 49 operates to release the valve head 41 for return to its normal position wherein it is closed at its seat 43. This completes the cycle of operation. The softener requires no further attention until such time as backwashing and/or regeneration is again required.

It will be evident from Fig. 2 of the drawing that the valve casing 6 is substantially identical in size and form with the casing 7 and that the valve mechanisms carried by these casings respectively are interchangeable. For example, the manually operable valve head 21 with its operating mechanism is interchangeable with the semi-automatic valve head 41 in either of these casings, the flow regulating device 37 is interchangeable in the branch 35 with the drainage fitting 13, the pipe 32 is interchangeable with the threaded nipple connected to elbow 11 and the hard water pipe 8 is interchangeable with the soft water service pipe 33 in the tapped ports of casings 6 and 7. As indicated in the drawing these casings may be constructed from a non-metallic material such as a suitable moldable plastic which may be drilled and tapped after molding to form such additional ports and connections as may be required. Important economies are affected by making the valve casings interchangeable and suitable for use in either location. The cost of the control is thereby reduced and both maintenance and operation is facilitated without sacrificing structure essential to efficient operation including provision for backwashing, automatic control of rate of flow during regeneration and automatic control of the duration of regeneration and flushing periods.

Having described our invention, what we claim as new and desire to protect by Letters Patent is:

1. In a control for water softening apparatus having a tank containing a body of softening material and valve mechanism connected respectively to a source of water, the upper and lower portions of said tank and to waste and service outlets, said valve mechanism comprising, a first multi-way valve unit having a movable head and ports connected respectively to said source of water, to said waste outlet, to inlet and outlet ports of a second valve and to the upper portion of the tank, a second multi-way valve unit having a movable head and inlet and outlet ports connected to said first valve and additional ports connected respectively to the lower portion of the tank and to said service outlet, the head of said first valve unit being movable to a first position in which flow is established from said source of water to the upper portion of the tank, and to a second position in which communication may be established from said source of water to said inlet port of the second valve unit, and wherein flow may be established from said port connected to the upper portion of the tank to said waste outlet, the head of said second valve unit being movable to a first position in which flow may be established from its port connected to the lower portion of the tank, to its port connected to said service outlet and the head of said second valve unit being movable to a second position in which flow may be established from its port connected to the lower portion of the tank to its outlet port connected to said first valve unit, means biasing the head of said second valve unit toward said first position and time control means operatively connected to the head of said second valve unit and adapted to retain it in said second position for predetermined periods of time and then release it for movement to its first position.

2. A control in accordance with claim 1 wherein a third valve is disposed to control flow from said first valve unit to said inlet port of the second valve unit.

References Cited in the file of this patent

UNITED STATES PATENTS

| Number | Name | Date |
|---|---|---|
| 1,654,537 | Dotterweich | Jan. 3, 1928 |
| 1,656,896 | Astron | Jan. 24, 1928 |
| 1,689,308 | Stickney | Oct. 30, 1928 |
| 2,347,201 | Lindsay | Apr. 25, 1944 |
| 2,460,011 | Hungerford et al. | Jan. 25, 1949 |
| 2,506,711 | Evans | May 9, 1950 |
| 2,535,432 | Lindsay | Dec. 26, 1950 |
| 2,553,458 | Jordan | May 15, 1951 |
| 2,562,315 | Kempton | July 31, 1951 |
| 2,610,147 | Lindsay | Sept. 9, 1952 |